Dec. 12, 1961    G. MALEK    3,012,491
MOTION PICTURE CAMERA
Filed Sept. 30, 1957

INVENTOR.
Georg Malek
BY Wenderoth, Lind & Ponack
Attorneys

United States Patent Office 3,012,491
Patented Dec. 12, 1961

3,012,491
MOTION PICTURE CAMERA
Georg Malek, Vienna, Austria, assignor, by mesne assignments, to Alois Handler and Karl Vockenhuber, Vienna, Austria
Filed Sept. 30, 1957, Ser. No. 687,178
Claims priority, application Austria Sept. 28, 1956
4 Claims. (Cl. 95—45)

This invention relates to a motion picture camera, in which an ancillary lens can be mounted on the normal lens which is provided with a focussing device. Unless the normal lens is set to infinity when the ancillary lens is mounted, this will adversely affect the quality of the picture or the shot will be entirely spoiled. This is a source of error, which is eliminated according to the invention by a locking device, which blocks the normal lens in its infinity setting when the ancillary lens is mounted. This measure will positively ensure that the normal lens is set to infinity when the ancillary lens is mounted and any focussing errors due to a misadjustment of the normal lens will be avoided.

According to the invention the arrangement may be such that the normal lens is movable into its blocked position by the movement by which the ancillary lens is mounted. In this case the operator of the camera need not take care that the normal lens is set to infinity before the ancillary lens is mounted but the normal lens will be automatically set to infinity. Where the normal lens is designed to receive an ancillary lens which can be fixed thereon by a rotation, e.g., by screwing, the arrangement may be such that the sense in which the normal lens is rotated to its infinity position coincides with the sense in which the ancillary lens is to be rotated to be fixed on the normal lens and that the resistance of a latch for blocking the normal lens in its infinity position, which resistance must be overcome in moving the normal lens to that position, is less than the resistance to be overcome in fixing the ancillary lens. It is also within the scope of the invention to design the normal lens or its setting member to interlock with the ancillary lens so as to enable the ancillary lens to be mounted only when the normal lens is in its infinity position. In this case the camera operator will be compelled to set the normal lens to infinity before mounting the ancillary lens because otherwise the latter cannot be mounted. This will also prevent a focussing error of the normal lens.

The invention is diagrammatically illustrated in the accompanying drawing by reference to embodiments shown by way of example.

Figure 1:
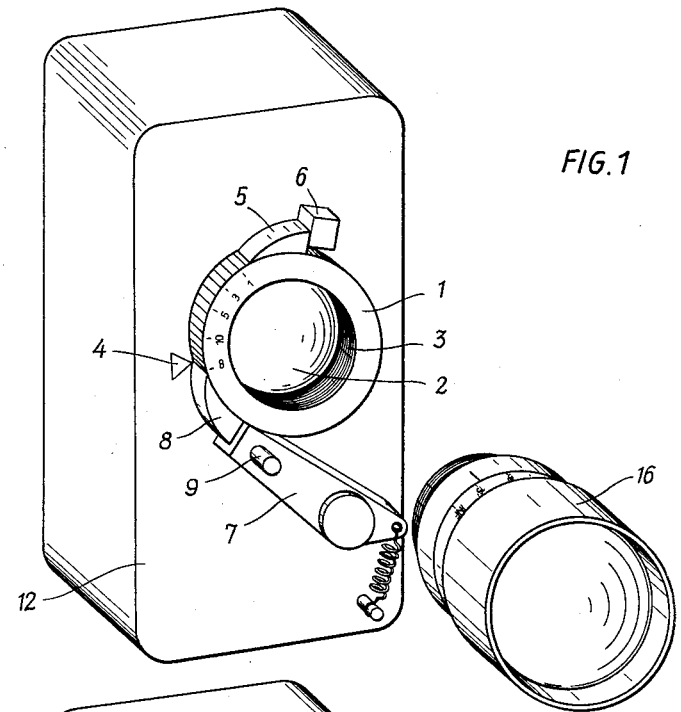
FIG. 1 shows an arrangement in which the normal lens is moved to its blocked position by the movement by which the ancillary lens is screwed thereon.

In the arrangement shown in FIG. 1 the focussing ring 1 of the normal lens 2 has a female screw-thread 3, into which the ancillary lens 16 is screwed in the clockwise sense. In the infinity position, which is indicated by a mark 4, the ancillary lens is turned to the right until a nose 5 engages a stationary stop 6. When the ancillary lens is being screwed in, the focussing ring 1 is automatically turned to the right until a resilient latch 7 snaps over a stop nose 8 of the focussing ring 1 to block the normal lens in its infinity position. The latch 7 can be lifted with the aid of a pin 9.

Figure 2:
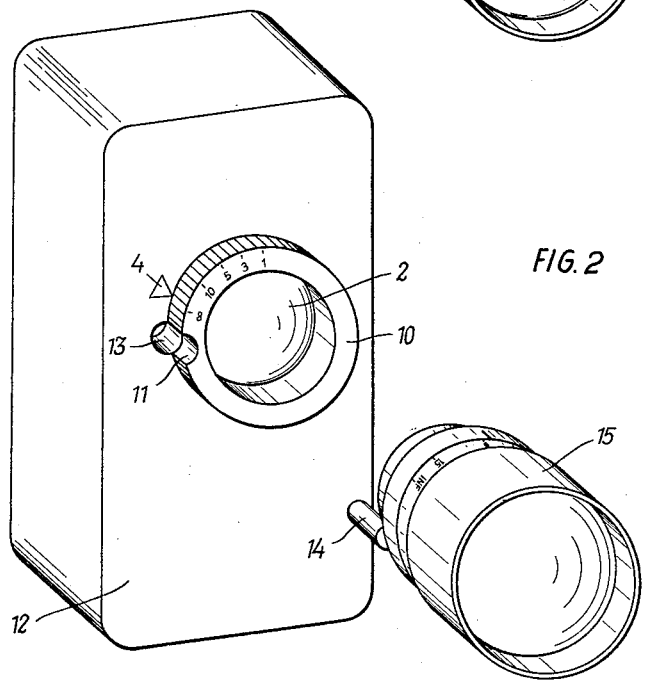
FIG. 2 shows an arrangement in which the ancillary lens can be mounted only when the normal lens is in its infinity position.

In the arrangement shown in FIG. 2 the mounting of the ancillary lens 16 is effected by pushing the same axially onto the focussing ring 10 of the normal lens 2. The infinity position of the normal lens is again indicated by a mark 4. The focussing ring 10 has a recess 11, and a hole 13 is provided in the casing wall 12. The ancillary lens has a pin fixed thereto, which fits into the recess 11 of the focussing ring 10 and into the hole 13 in the casing wall 12. For this reason the ancillary lens can be completely moved onto the focussing ring 10 of the normal lens 2 only when the focussing ring 10 is in its infinity position, in which the recess 11 of the ring registers with the hole 13 in the casing wall 12.

What I claim is:
1. A camera comprising a normal lens, means for focusing said normal lens, an ancillary lens to cooperate with said normal lens, means for mounting said ancillary lens on said normal lens and means for automatically locking said normal lens in its infinity position when said ancillary lens is attached to said normal lens.

2. A camera comprising a normal lens, means for focusing said normal lens, a rotatable focusing ring coaxially mounted on said normal lens, an ancillary lens to cooperate with said normal lens, means for mounting said ancillary lens on said focusing ring, said last named means including means for automatically moving said normal lens to its infinity position and locking it there.

3. A camera as set forth in claim 2 wherein said means for mounting said ancillary lens on said focusing ring comprises a threaded connection wherein said ancillary lens is mounted on said focusing ring, a latch for locking the latter in the infinity position, the direction of rotation of screwing the ancillary lens upon the focusing ring coinciding with the direction of rotation of the focusing ring to the infinity position, the resistance to be overcome of said latch, locking the focusing ring in the infinity position, being smaller than the resistance to be overcome in mounting the ancillary lens.

4. A camera comprising a normal lens, means for focusing said normal lens comprising a rotatable focusing ring coaxially mounted on said normal lens, an ancillary lens cooperating with said normal lens, means for mounting said ancillary lens on said normal lens, said focusing ring having a recess therein, a part fixed to the camera having a hole therein, said recess and said hole being in registry when said focusing ring is set to infinity, a pin mounted on said ancillary lens to be inserted into said hole and recess on attaching said ancillary lens, so that an attachment of said ancillary lens is only possible when said focusing ring of the normal lens is set to infinity.

References Cited in the file of this patent
UNITED STATES PATENTS

| | | |
|---|---|---|
| 1,819,476 | Owens | Aug. 18, 1931 |
| 1,935,430 | Barnack | Nov. 14, 1933 |
| 2,117,231 | Trautmann | May 10, 1938 |
| 2,172,338 | Mihalyi | Sept. 5, 1939 |
| 2,263,024 | Wood | Nov. 18, 1941 |